Dec. 17, 1929.  A. W. SCHENKER  1,739,991
STOP COCK OR VALVE
Filed April 2, 1927
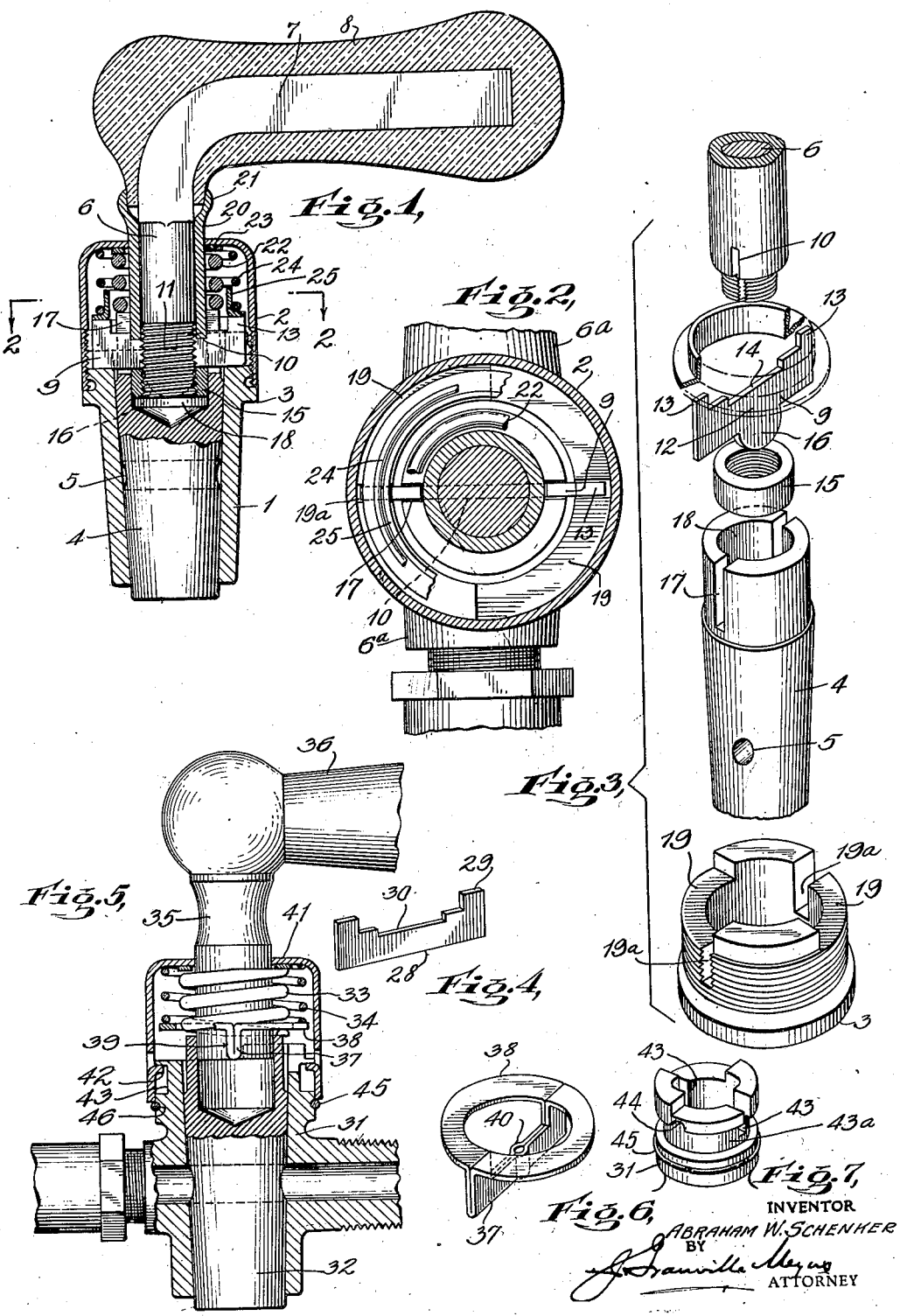
INVENTOR
ABRAHAM W. SCHENKER
BY
ATTORNEY Patented Dec. 17, 1929

1,739,991

UNITED STATES PATENT OFFICE

ABRAHAM W. SCHENKER, OF FOREST HILLS, NEW YORK

STOP COCK OR VALVE

Application filed April 2, 1927. Serial No. 180,522.

This invention is an improvement in valves, and with respect to its more specific features in self-locking valves.

In the usual construction of valve designed particularly for use in controlling the flow of fluids, such as illuminating gas, there is nothing to prevent accidental opening of the valve, with consequent danger to life and property through discharge of the gas.

In order to successfully control such fluids, the valve must be tight in its seat, and must be retained tight, regardless of wear.

Valves of this character are usually provided with a sleeve of heat insulating material to be grasped in turning the valve. This material is as a rule arranged on a lateral extension from the handle member, and held in place by a screw or the like. The arrangement facilitates chipping, especially at the end adjacent to the operating member, thus conducing to looseness of the sleeve and the liability to further damage by breakage.

In valves of the character in question, it is desirable that all of the moving elements thereof be housed, and preferably in a common chamber, and that the chamber be so arranged that access may be easily gained thereto.

One of the primary objects of the present invention is the provision of a valve of the character specified, wherein the plug is resiliently pressed to its seat with a continuing pressure, to hold the plug tight, and to compensate for wear.

Another object is the provision of a valve so constructed that it automatically locks into closed position, and in which other manipulation than merely the turning of the valve is necessary to open the same.

Another object is the provision of spring means for holding the valve to its seat, and for locking the valve in closed position, housed within the casing.

Another object is the provision of a valve wherein the several elements are contained in a common chamber having a removable cap, enabling access to the parts when desired.

Another object is the provision of a valve having an operating handle completely covered with heat insulating material, so arranged as to prevent chipping and breakage.

Another object is the provision of a valve including a casing constituting a common chamber for housing the movable elements of the valve, wherein the closure thereof is easily detachable from the body, and is provided with means to lock it thereto, and is normally held in locked position by the spring means for holding the plug tight.

With these and other objects in view the invention consists in the construction and novel combination of parts fully described hereinafter, illustrated in the accompanying drawings, and pointed out in the claims appended hereto, it being understood that various changes in the form, proportion, size and minor details of construction within the scope of the claims, may be resorted to without departing from the spirit of the invention.

In the drawings forming a part hereof:

Fig. 1 is a longitudinal section of an embodiment of the improved valve.

Fig. 2 is a section on the line 2—2 of Fig. 1.

Fig. 3 is a detail in perspective of the valve with the parts separated.

Fig. 4 is a perspective view of an alternate form of key.

Fig. 5 is a view similar to Fig. 1 of an alternate arrangement of cap and key.

Fig. 6 is a perspective view of the key shown in Fig. 5.

Fig. 7 is a perspective view of the upper end of the valve casing of Fig. 5.

In the embodiment of the invention shown in Figures 1 and 3, the improved valve includes a casing composed of a body 1 having a tapering bore, and a cap 2 detachably connected with the body, in the present instance by means of screw threads. The open end of the cap fits outside the body as shown, and abuts an annular rib or shoulder 3 to limit the movement of the cap toward the body.

The bore of the body is tapered as above stated, and the plug 4 is shaped to fit the bore. The plug has the usual cross passage 5 for registering with the inlet and outlet nipples 6ª of the body, and it is detachably connected with a handle member to be described, in such manner that while the plug must move angularly with the handle member, the said member may move within limits toward and from the plug.

The handle member in the present instance is an L-shaped rod or bar, one of the arms 6 thereof being connected to the plug, and the other arm 7 serving as a handle, and being provided with a covering 8 of heat insulating material such as porcelain. The insulation covers not only the arm 7, but a part of the arm 6, and the junction between the arms, as clearly shown in Figure 1, and it is baked in place on the handle.

The handle member is connected to the plug by means of a cross key 9 held in a slot 10 extending longitudinally of the portion 6 of the handle member. The lower end of the handle member is threaded as shown at 11, and the slot passes through and beyond the threaded portion a sufficient distance to entirely receive the body of the key. The cross key as shown in Figure 3 is yoke shaped, the body 12 thereof extending through the slot, while the arms 13 extend toward the handle member. A notch 14 is provided in the body, the notch being of a length corresponding to the diameter of the handle member, so that the ends of the notch will engage the periphery of the handle member, when the cross key is in place.

The key is held in place by a nut 15 threaded onto the reduced end of the handle member. This nut is a ring nut, and it bears against the cross key when screwed home. The key has a lug 16 opposite the notch 14, of a width corresponding to the diameter of the threaded portion of the handle member. The free end of the lug is rounded as shown, so that when the nut is turned on to the reduced portion the key is centered.

The ends of the key engage within a cross slot 17 in the plug, and it will be noticed that the upper end of the plug is counterbored as shown at 18 to receive the nut and the end of the handle member. Thus the plug is constrained to rotate with the handle member, but the handle member is free to move toward and from the plug for a purpose to be presently described.

The cross key also serves as a stop or limiting member for the plug. The ends of the key move in notches 19 in the upper end of the casing body, and at corresponding ends the notches are deepened as indicated at 19ª. When the valve is in closed position, the ends of the key engage the deepened portions or recesses 19ª, and the said ends must be released from the recesses, before they can move in the notches 19 to open the valve.

In the embodiment shown, a sleeve or ferrule 20 encircles the portion 6 of the handle member between the threaded portion and the insulating covering, and that end of the sleeve adjacent to the cover is flared as shown at 21 to engage closely outside of the end of the covering. A coil spring 22 encircles the ferrule, one end bearing against the end of the plug, and the other end against a washer 23 abutting the end of the cap. This spring acts to hold the plug on its seat, and to exert a continuing pressure thereon, to compensate for wear.

A second spring 24 is arranged coaxial with the spring 22, one end thereof bearing against the end of the cap, while the other end engages a centering washer 25. This washer is L-shaped in cross section, the radial portion thereof bearing against the ends of the key, while the cylindrical portion fits within the endmost coil or coils of the spring. The arrangement of the spring is such that the key is normally pressed toward the casing body, and when it is in register with the recesses 19ª, it will be forced into them to lock the handle member and the plug against turning. To enable turning of the plug, the handle member must be drawn outward far enough to bring the ends of the key to the level of the notches.

In operation, when it is desired to open the valve, the handle member is drawn outward to release the ends of the key from the locking recesses 19ª. The handle member is now free to turn, and with it the plug. When the handle member is turned to close the plug, the spring 24 presses the key ends into the recesses, thus locking the plug against accidental displacement. In assembling the parts, the handle member is first passed through the opening of the cap. The springs and washers are then placed in the cap, after which the key is inserted in the slot of the handle member, and the nut threaded into place. When now the end of the handle member and the nut is pushed into the counterbore of the plug, the cap may be threaded onto the body, by compression of the spring 22.

In Fig. 4, an alternate arrangement of locking key is shown. This key is yoke shaped, the body thereof engaging the slot 10 in the same manner as the body 12 of the key 12—13 of Figure 1, while the arms 29 are similar to the arms 13 of the said key. The upper edge of the key is notched as shown at 30 in the same manner as the key 12—13, but the lug at the lower edge is omitted, the notch 30 being depended upon to center the key.

In Fig. 5, an arrangement of quick detachable cap is shown, and an alternate form of plug and handle locking means. In this embodiment the body 31 of the casing and the plug 32 are substantially the same as in the Fig. 1 construction. The springs 33 and 34 are like the springs 22 and 24. The handle 35 is of the usual construction, having a lateral extension at its outer end, covered with a sleeve 36 of heat insulating material, such for instance as porcelain.

The locking key 37 is an integral part of a washer 38, which corresponds to the washer 25 of Fig. 1. As shown in Fig. 6, the washer is formed from a blank having the central portion thereof bent laterally, and doubled upon itself to form the key. The spring 34 bears against the washer, and holds the key in the slot 39 of the plug. The upper end of the body 31 has the notches and recesses corresponding to those of Fig. 1 for engagement by the key to lock or to enable movement of the plug.

The washer and key are preferably secured to the handle 35 by means of a screw or the like, not shown, passing through an opening 40 formed in the center of the key body, and engaging the end of the handle member 35. It will be noticed referring to Fig. 5, that the washer 38 has a sufficiently large internal diameter to pass the spring 33, so that the said spring may bear directly against the plug to hold it to its seat, and to compensate for wear.

Instead of a threaded connection between the cap 41 and the body 31, the cap is provided with inwardly extending lugs 42, which are adapted to pass downwardly through the slots 43 in the upper end of the casing engaged by the ends of the key, the slots corresponding to the slots 19$^a$ of Figures 1 and 3. An external annular groove 43$^a$ is provided in the upper end of the valve casing, into which the slots 43 extend.

When the cap is pressed toward the body against the resistance of the springs 33 and 34, with the lugs 42 in register with the slots 43, the lugs move through the slots until they come into register with the groove 43$^a$. Angular movement of the cap will cause the lugs to move in the groove and to lock beneath the upper wall thereof. In order to prevent accidental angular movement of the cap, locking notches 44 are provided in said upper wall, halfway between the slots 43, so that a quarter turn of the cap, after the lugs 42 are in the groove 43$^a$ will bring said lugs into register with the notches 44, and on release of the cap the springs will force the lugs into the notches, thus locking the cap against angular movement.

Releasable means is provided for preventing disengagement of the lugs from the notches 44. Such means is constituted by a split ring 45 of resilient material, which engages within an annular groove 46 in the casing body, below the groove 43$^a$. After the cap has been placed and the lugs 42 engaged with the notches 44, the ring is snapped in place, and the groove is so placed with respect to the cap that when the parts are in normal position, the ring will be at the inner open end of the cap, and will hold the same from movement toward the valve casing.

What is claimed as new is:

1. In a valve of the class described, a casing, a plug and an operating member therefor, a key connection between the plug and the member for constraining them to rotate together while enabling longitudinal movement with respect to each other, and a plurality of springs within the casing, one spring pressing the plug to its seat, and the other normally pressing the operating member toward the plug, and locking mechanism between the key and the casing for preventing angular movement of the plug released by movement of the operating member away from the plug.

2. In a valve of the class described, a casing, a plug and an operating member therefor, a key connection between the plug and the member for constraining them to rotate together while enabling longitudinal movement with respect to each other, and a plurality of springs within the casing, one spring pressing the plug to its seat, and the other normally pressing the operating member toward the plug, locking mechanism between the key and the casing for preventing angular movement of the plug released by movement of the operating member away from the plug, the end of the operating member transversely slotted to receive the key, a nut engaging the end of the member to hold the key in place, and means in connection with the key, the nut and the member for centering the key.

3. In a valve of the class described, a plug and a handle member, mechanism to constrain the plug to rotate with the member while enabling relative movement of the plug and member toward and from each other, including a cross key, the member slotted from the end adjacent to the plug to receive the key, the plug having slots for engagement by the ends of the key, a nut threaded onto said end of the member to hold the key in place, and means in connection with the key, the member and the nut to center the key prior to the engagement of the nut with the member, said means including a notch in that edge of the key adjacent to the member, the ends of the notch engaging the periphery of the member.

4. In a valve of the class described, a plug and a handle member, mechanism to constrain the plug to rotate with the member while enabling relative movement of the plug and member toward and from each other, including a cross key, the member slotted from the end adjacent to the plug to receive the key, the plug having slots for engagement by the ends of the key, and means to center the key with respect to the member, including a notch in that edge of the key adjacent to the member of a length corresponding to the width of the slot.

5. In a valve of the class described, a plug and a handle member, mechanism to constrain the plug to rotate with the member while enabling relative movement of the plug and member toward and from each other, including a cross key, the member slotted from the end adjacent to the plug to receive the key, the plug having slots for engagement by the ends of the key, a nut threaded onto said end of the member to hold the key in place, and means in connection with the key, the member and the nut to center the key prior to the engagement of the nut with the member, said means including a notch in that edge of the key adjacent to the member of a length corresponding to the width of the slot and a rounded lug on the key edge engaging within the nut.

6. In a valve of the class described, a casing including a body and a cap, a plug rotatable in the body, and an operating member therefor, a key connection between the plug and the member for constraining them to rotate together while enabling longitudinal movement with respect to each other, the cap engaging about an end of the body, said cap and body having interengaging means for holding the cap to the body engaged and released by relative angular movement of the cap and body, and a plurality of springs enclosed by the cap and body, one between the cap and the plug, and the other between the cap and the operating member.

7. In a valve of the class described, a casing including a body and a cap, a plug rotatable in the body, and an operating member therefor, a key connection between the plug and the member for constraining them to rotate together while enabling longitudinal movement with respect to each other, the cap engaging about an end of the body, said cap and body having interengaging means for holding the cap to the body engaged and released by relative angular movement of the cap and body, and a plurality of springs enclosed by the cap and body, one between the cap and the plug, and the other between the cap and the operating member, the last named spring of lighter tension than the first named.

8. In a valve of the class described, a plug and a handle member, mechanism to constrain the plug to rotate with the member while enabling relative movement of the plug and member toward and from each other, including a cross key, the member slotted from the end adjacent to the plug to receive the key, the plug having slots for engagement by the ends of the key, a washer carried by the key and encircling the member, a casing for the plug, a spring between the casing and the plug, and another spring between the washer and the casing.

9. In a valve of the class described, a plug and a handle member, mechanism to constrain the plug to rotate with the member while enabling relative movement of the plug and member toward and from each other, including a cross key, the member slotted from the end adjacent to the plug to receive the key, the plug having slots for engagement by the ends of the key, a washer carried by the key and encircling the member, a casing for the plug, a spring between the casing and the plug, and another spring between the washer and the casing, the washer of a diameter to pass the first named spring.

10. A device of the class described comprising a body having a removable cap, a plug rotatably seated in the body, a stem cooperative with the plug, axially removable with respect thereto and extending through said cap, a pin extending through the stem and through the plug and operative to cause the plug and stem to rotate as a unit, the ends of the pin projecting beyond the surface of the plug and overlying the body and the latter being provided with a slot adapted to receive said ends when in one position and with elevated surfaces adapted to support said ends when in another position, yielding means including a sleeve surrounding the plug disposed between the cap and the pin operative to constantly urge the pin downward to cause it to engage said elevated surfaces or to enter said slot, and means housed within the cap for yieldingly holding the plug on its seat.

11. A device of the class described comprising a body having a slot and diametrically opposed arcuate surfaces extending in opposite directions from said slot and disposed in a plane above the bottom thereof, a plug rotatably seated in the body and having a slot at its upper end and an axial socket, a stem slidably projecting into said socket, a pin extending through the stem and through the slot in the plug whereby said stem is locked to said plug for rotation but is axially movable with respect thereto, the ends of the pin projecting beyond the plug and being adapted to rest on said surfaces or to enter the slot in the body when aligned therewith, a spring for holding the plug on its seat, a sleeve surrounding said spring and said stem and resting on the projecting ends of the pin, a removable cap disposed on the body and through which the stem extends, and a spring disposed between the sleeve and the cap and operative to urge the ends of the pin into engagement with said surfaces and to cause said pin to automatically enter the slot in the body when aligned therewith so as to lock the plug and stem against rotation with respect thereto.

12. In a valve of the class described, a casing, a rotatable tapered plug seated therein, an operating stem to turn the plug to open and closed positions, a locking device connected to the stem for holding the stem in its closed position, spring means between the casing and the plug and between the locking device and the casing respectively for pressing the plug to its seat and for holding the locking device in active position respectively, said stem being movable axially with relation to the plug against the tension of the spring means cooperating with the locking device to release the plug when desired.

13. In a valve of the class described, a casing, a rotatable tapered plug seated therein, an operating stem for turning the plug to open and closed positions, spring means arranged at the upper end of said plug to maintain it to its seat, a locking device connected to the stem for holding the plug in its closed position, spring means operating normally to hold the locking device in active position, said stem being movable axially with relation to the plug against the tension of the last named spring means to release the plug when desired.

Signed at New York, in the county of New York and State of New York, this 25th day of March A. D. 1927.

ABRAHAM W. SCHENKER.